(12) United States Patent
Dorris et al.

(10) Patent No.: US 9,803,320 B2
(45) Date of Patent: Oct. 31, 2017

(54) DRY CELLULOSE FILAMENTS AND THE METHOD OF MAKING THE SAME

(71) Applicant: FPINNOVATIONS, Pointe-Claire (CA)

(72) Inventors: Gilles Marcel Dorris, Laval (CA); Yuxia Ben, Kirkland, CA (US); Thomas-Qiuxiong Hu, Vancouver (CA); Patrick Neault, Les Coteaux (CA)

(73) Assignee: FPINNOVATIONS, Pointe-Claire, QC (CA)

( * ) Notice: Subject to any disclaimer, the term of this patent is extended or adjusted under 35 U.S.C. 154(b) by 0 days.

(21) Appl. No.: 14/440,930

(22) PCT Filed: Nov. 7, 2013

(86) PCT No.: PCT/CA2013/050853
§ 371 (c)(1),
(2) Date: May 6, 2015

(87) PCT Pub. No.: WO2014/071523
PCT Pub. Date: May 15, 2014

(65) Prior Publication Data
US 2015/0275433 A1   Oct. 1, 2015

Related U.S. Application Data

(60) Provisional application No. 61/723,517, filed on Nov. 7, 2012.

(51) Int. Cl.
*D21H 11/20* (2006.01)
*D21H 27/00* (2006.01)
(Continued)

(52) U.S. Cl.
CPC ............... *D21H 11/20* (2013.01); *C08J 5/18* (2013.01); *C08L 1/02* (2013.01); *D21H 11/04* (2013.01);
(Continued)

(58) Field of Classification Search
CPC . C08J 2301/02; C08J 5/18; C08L 1/02; C08L 2205/16; D21H 11/04; D21H 11/20;
(Continued)

(56) References Cited

U.S. PATENT DOCUMENTS 7,566,014 B2    7/2009  Koslow et al.
9,051,684 B2 *  6/2015  Hua .................... D21D 1/20
(Continued)

FOREIGN PATENT DOCUMENTS

CA    2799123        11/2011
CA    2889991 A1 *  5/2014  ............... C08J 5/18
(Continued)

OTHER PUBLICATIONS

Fernandes Diniz, et al., "Hornification—its origin and interpretation in wood pulps," Wood Sci Technol, vol. 37, 2004, pp. 489-494.
(Continued)

*Primary Examiner* — Jose Fortuna
(74) *Attorney, Agent, or Firm* — Norton Rose Fulbright Canada LLP

(57) ABSTRACT

The present invention relates to dry cellulose filaments and particularly those that are re-dispersible in water. Dry cellulose filaments comprise at least 50% by weight of the filaments having a filament length up to 350 μm; and a diameter of between 100 and 500 nm, wherein the filaments are re-dispersible in water. Also described here is a film of dry cellulose filaments comprising the filaments described, wherein the film is dispersible in water. A method of making a dry film of cellulose filaments is also described that
(Continued)

includes providing a liquid suspension of the cellulose filaments described; and retaining the filaments on the forming section of a paper or tissue making machine or on a modified paper or tissue making machine. The film can be optionally converted to powders or flakes for shipment, storage or subsequent uses. The filaments, the film, the powders or flakes and the method are in a preferred embodiment free of additives and the derivatization of the filaments.

16 Claims, 3 Drawing Sheets

(51) Int. Cl.
| | | |
|---|---|---|
| C08J 5/18 | (2006.01) | |
| C08L 1/02 | (2006.01) | |
| D21H 13/02 | (2006.01) | |
| D21H 17/25 | (2006.01) | |
| D21H 21/18 | (2006.01) | |
| D21H 11/04 | (2006.01) | |

(52) U.S. Cl.
CPC .............. *D21H 13/02* (2013.01); *D21H 17/25* (2013.01); *D21H 21/18* (2013.01); *D21H 27/002* (2013.01); *C08J 2301/02* (2013.01); *C08L 2205/16* (2013.01); *Y10T 428/298* (2015.01)

(58) Field of Classification Search
CPC ........ D21H 13/02; D21H 17/25; D21H 21/18; D21H 27/002; D21H 11/16; D21H 11/18; D21D 1/20; Y10T 428/298
See application file for complete search history.

(56) References Cited

U.S. PATENT DOCUMENTS

| 9,422,641 | B2* | 8/2016 | Jackson | ................ D01F 1/02 |
| 2013/0017394 | A1* | 1/2013 | Hua | ................ D21D 1/20 |
| | | | | 428/401 |
| 2014/0288296 | A1* | 9/2014 | Qi | ................ C08J 5/18 |
| | | | | 536/56 |
| 2015/0275433 | A1* | 10/2015 | Dorris | ................ C08J 5/18 |
| | | | | 162/157.6 |
| 2016/0319482 | A1* | 11/2016 | Ben | ................ D21C 9/18 |

FOREIGN PATENT DOCUMENTS

| CA | WO 2014071523 A1 * | 5/2014 | ............ C08J 5/18 |
| CA | KR 20150082523 A * | 7/2015 | ............ C08J 5/18 |
| JP | 2011026760 | 2/2011 | |
| WO | 2012/097446 | 7/2012 | |

OTHER PUBLICATIONS

Herrick, F.W., U.S. Pat. No. 4,481,076; Lowys, M.-P. et al, "Rheological Characterization of Cellulosic Microfibril Suspensions. Role of Polymeric Additives," Food Hydrocolloids, vol. 15, 2001, pp. 25-32.

Eyholzer, C. et al, "Preparation and Characterization of Water-Redispersible Nanofibrillated Cellulose in Powder Form," Cellulose, vol. 17, No. 1, 2010, pp. 19-30.

* cited by examiner

DRY CELLULOSE FILAMENTS AND THE METHOD OF MAKING THE SAME

CROSS-REFERENCE TO RELATED APPLICATIONS

This application is a National entry of PCT/CA2013/050853 filed Nov. 7, 2013, in which the United States of America was designated and elected, and which remains pending in the International phase until May 7, 2015, which application in turn claims priority under 35 USC 119(e) from U.S. Provisional Application Ser. No. 61/723,517, filed Nov. 7, 2012.

FIELD OF THE INVENTION

The present invention relates to dry cellulose filaments and particularly those that are re-dispersible in water.

BACKGROUND ART

Cellulose filaments (CF) previously referred to as cellulose nanofilaments (CNF) are known to have many interesting properties one of which is increasing the dry and wet strength properties of paper when used as an additive in the production thereof. They are produced by refining wood or plant fibers at a high to very high level of specific energy using high consistency refiners (Hua, X., et al. High Aspect Ratio Cellulose Nanofilaments and Method for their Production. PCT/CA2012/000060; WO 2012/097446 A1, 2012). They have superior reinforcement ability over cellulose microfibrils or nanofibrils such as microfibrillated cellulose (MFC) or nanofibrillated cellulose (NFC) prepared using other methods for the mechanical fibrillation of wood pulp fibers, because of their longer lengths and higher aspect ratio as a result of their unique production process which minimizes fiber cutting.

The production of cellulose filaments occurs in suspension with water at a consistency up to 60%. Consistency is the weight percentage of a cellulose material in a mixture of the cellulose material and water. One serious drawback to using cellulose filaments is the difficulty of preparing dry cellulose filaments without decreasing their dispersibility in aqueous media and/or their reinforcement ability. This difficulty is similar to that for the drying of other cellulose microfibrils or nanofibrils or even pulp fibers by conventional means, and is due to so-called hornification. Hornification is attributed to many factors that include: the formation of irreversible hydrogen bonds (H-bonds) and/or the formation of lactone bridges (Fernandes Diniz, et al., "Hornification—its origin and interpretation in wood pulps," Wood Sci Technol, Vol. 37, 2004, pp. 489-494). Hornification produces a dried cellulose filament material that cannot be re-dispersed into water, a water solution or a water suspension, such as a pulp and paper suspension, when the dry cellulose filaments are mixed with wood pulps in a pulper or mixing chess for usage as a paper strengthening additive.

To avoid the disadvantage of irreversible hornification that produces non-dispersible microfibrillated cellulose (MFC) or nanofibrillated cellulose (NFC), two approaches have been attempted: 1) processing MFC with additives or 2) derivatizing MFC or NFC.

Each of these approaches has its disadvantages. With the first approach to reducing hornification, MFC are dried with additives that block the formation of H-bonds and help to prevent H-bond or lactone bridge formation (Herrick, F. W., U.S. Pat. No. 4,481,076; Lowys, M.-P. et al, "Rheological Characterization of Cellulosic Microfibril Suspensions. Role of Polymeric Additives," Food Hydrocolloids, Vol. 15, 2001, pp. 25-32; and Cantiani, R. et al. U.S. Pat. No. 6,306,207 B2). These additives include: sucrose, glycerin, ethylene glycol, dextrin or carboxymethyl cellulose. Here the main drawback is the large quantity of the additives required, in some cases more than 15% by weight are used.

The second approach to reducing hornification in MFC or NFC during drying is to derivatize the microfibrillated or nanofibrillated cellulose with the introduction of various groups including carboxyl groups (Eyholzer, C. et al, "Preparation and Characterization of Water-Redispersible Nanofibrillated Cellulose in Powder Form," Cellulose, Vol. 17, No. 1, 2010, pp. 19-30; Cash, M. J. et al. Derivatized Microfibrillar Polysaccharide U.S. Pat. No. 6,602,994 B1). However, the derivatization requires the use of large amounts of the reagent, for example, 5.81 g of monochloroacetic acid (MCA) (7.26 g of 80% MCA) per 36 g of MFC in an isopropanol and water solution under a nitrogen atmosphere. It has not been established that MFC derivatized with MCA or other molecules can be re-dispersed in water after drying

SUMMARY

Prior to the present invention, no dry and water re-dispersible filaments of substantially fibrillated cellulose materials have been reported. In the present invention, dry and water re-dispersible fibrillated cellulose, cellulose filaments are produced free of chemical additives and free of derivatization, such as for example, the carboxymethylated fibrillated cellulose materials.

In accordance with one aspect of the present invention, there is provided a dry cellulose filaments comprising: at least 50% by weight of the filaments having a filament length up to 350 μm; and a diameter of between 100 and 500 nm, wherein the filaments are re-dispersible in water.

In accordance with yet another aspect of the present invention, there is provided the filaments herein described, wherein at least 75% and more preferably 90% by weight of the filaments comprising a filament length up to 350 μm; and a diameter of between 100 and 500 nm.

In accordance with one aspect of the present invention, there is provided the filaments herein described, that are free of additives.

In accordance with another aspect of the present invention, there is provided the filaments herein described, that are free of derivatization.

In accordance with yet another aspect of the present invention, there is provided the filaments herein described, wherein the filament lengths are between 300 and 350 μm.

In accordance with still another aspect of the present invention, there is provided the filaments herein described, wherein the filaments are at least 80% by weight solids.

In accordance with yet still another aspect of the present invention, there is provided the filaments herein described, wherein the filaments are at least 80% and preferably 95% by weight solids.

In accordance with another aspect of the present invention, there is provided a film of dry cellulose filaments comprising: at least 50% by weight of the filaments with a filament length up to 350 μm and a diameter of between 100 and 500 nm, wherein the film is dispersible in water.

In accordance with still a further aspect of the present invention, there is provided the film herein described, wherein at least 75% and more preferably 90% by weight of the filaments comprise a filament length up to 350 µm; and a diameter of between 100 and 500 nm.

In accordance with a further aspect of the present invention, there is provided the film herein described, wherein the film has a range of thickness from 10 to 300 µm.

In accordance with yet a further aspect of the present invention, there is provided the film herein described, wherein filaments are free of at least one of additives and derivatization.

In accordance with still a further aspect of the present invention, there is provided the film herein described, wherein the filaments lengths are between 300 and 350 µm.

In accordance with yet still a further aspect of the present invention, there is provided the film herein described, wherein the filaments are at least 80% by weight solids.

In accordance with one embodiment of the present invention, there is provided the film herein described, wherein the filaments are at least 95% by weight solids.

In accordance with yet another aspect of the present invention, there is provided a method of making a dry film of cellulose filaments comprising: providing a liquid suspension of the cellulose filaments wherein at least 50% by weight of the filaments have a filament length up to 350 µm; and a filament diameter between 100 and 500 nm, and retaining the filaments on a forming section of a paper making machine. In a preferred embodiment the paper making machine is a Standard Sheet Machine with a 150- to 400-mesh screen.

In accordance with still another embodiment of the present invention, there is provided the method herein described, wherein at least 75% and more preferably 90% by weight of the filaments comprise a filament length up to 350 µm; and a diameter of between 100 and 500 nm.

In accordance with another embodiment of the present invention, there is provided the method herein described, further comprising pressing the film in a press section of the machine to produce a pressed film.

In accordance with yet another embodiment of the present invention, there is provided the method herein described, further comprising drying the pressed film in at least one dryer section of the machine to produce the dry film.

In accordance with still another embodiment of the present invention, there is provided the method herein described, wherein the film produced is re-dispersible in water.

In accordance with yet still another embodiment of the present invention, there is provided the method herein described, wherein the film produced has a range of thickness from 200-300 µm or less.

In accordance with a further embodiment of the present invention, there is provided the method herein described, wherein the film is at least 80% by weight solids.

In accordance with yet a further embodiment of the present invention, there is provided the method herein described, wherein the film are at least 95% by weight solids.

In accordance with still a further embodiment of the present invention, there is provided the method herein described, wherein the filaments lengths are between 300 and 350 µm.

In accordance with yet a further embodiment of the present invention, there is provided dry, water re-dispersible powders or flakes of the filaments made from the dry, water re-dispersible film of the filaments using mechanical devices that are capable of reducing the size of the dry, water re-dispersible film of the filaments.

In accordance with still a further embodiment of the present invention, there is provided the method herein described, wherein the paper making machine operates at a speed of 500-1500 m/min, preferably from 750-1200 m/min.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

Figure 1A:
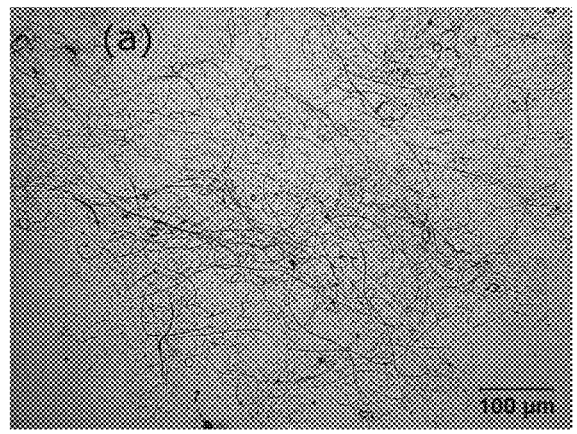
FIG. 1*a* is a light microscopy image of representative cellulose filaments (CF) with, by visual inspection and estimation, at least 80% by weight of the filaments having lengths of up to 300-350 µm and diameters of approximately 100-500 nm produced by multi-pass, high consistency refining of bleached softwood kraft pulp according to one embodiment of the present invention.

In many potential applications dry fibrillated cellulose materials are required. Dry fibrillated cellulose materials have a longer shelf life, and reduce the cost of shipping the materials from a production facility to an end-user's location.

Although several methods for the dewatering/drying of fibrillated cellulose materials have been reported, no method for the production of dry, water re-dispersible fibrillated cellulose materials without the use of chemical additives or the chemical modification of the materials has been described. Furthermore, no method for a continuous production of dry, water re-dispersible fibrillated cellulose materials on a machine commonly used to manufacture paper, tissue or paperboard has ever been reported.

The cellulose nanofilaments (CNF), defined herein and referred to as cellulose filaments (CF), have in a preferred embodiment lengths of up to 300-350 µm and diameters of approximately 100-500 nm. The CFs are produced by multi-pass, high consistency refining of wood or plant fibres such as a bleached softwood kraft pulp as described in WO2012/097446 A1 incorporated herein by reference. The CFs are structurally very different from other cellulose fibrils such as microfibrillated cellulose (MFC) or nanofibrillated cellulose (NFC) prepared using other methods for the mechanical disintegration of wood pulp fibres in that they have at least 50%, preferably 75%, and more preferably 90% by weight of the filaments of the fibrillated cellulose material have a filament length of up to 300-350 µm and diameters of approximately 100-500 nm. The fibrillated cellulose material in MFC typically has lengths shorter than 100 µm while the fibrillated cellulose material in NFC typically has lengths shorter than 1 µm. However, it should be recognized by experts in the production of fibrillated cellulose materials that CFs, like other fibrillated cellulose materials produced using mechanical means, are not a homogeneous material with one single dimension value. The CF in a preferred embodiment having lengths of up to 300-350 µm and diameters of approximately 100-500 nm defined herein refers to a fibrillated cellulose material produced by multi-pass, high consistency refining of wood or plant fibres and with no less than 50% by weight of its fibrillated material having lengths of up to 300-350 µm and diameters of approximately 100-500 nm. The precise percentage of the fibrillated cellulose material having lengths of up to 300-350 µm and diameters of approximately 100-500 nm depends on the total energy input, the number of the refining passes, the refining intensity and other refiner operating conditions.

These same cellulose filaments (CF) with lengths of up to 300-350 µm and diameters of approximately 100-500 nm by multi-pass, high consistency refining of wood or plant fibers, when dried using common drying methods such as drum-drying or air-drying, are not fully re-dispersible in water and their reinforcement power is much lower than the never-dried CF. In a preferred embodiment the lengths of the CFs are 300 to 350 µm.

The term "dry" as defined herein in reference to the filaments described herein refers to a solid content of the cellulose filaments being no less than 80% by weight solids, or a moisture content of no more than 20% by weight. In a particularly preferred embodiment the solids content of the cellulose filament is no less than 90% by weight solids, or a moisture content of no more that 10% by weight. The term "water re-dispersible" as defined herein refers to the ability of the dried cellulose filaments to form a stable water dispersion upon mechanical agitation in an aqueous medium at ambient or an elevated temperature. This dispersion is free from materials such as hornified pellets of cellulose that cannot be re-dispersed.

The expressions "reinforcement power and/or strength properties similar to" are defined herein to be comparative expressions that indicate that no less than 80% of the said reinforcement power and/or strength properties of the CF of the present invention is obtained in paper when compared to the same quantity of never-dried CFs.

The expression "never-dried" is defined herein to describe cellulose filaments (CF) that have never been dried and have remained in a wet stage with up to 60% solids by weight after their production from wood or plant fibres.

The present invention for the first time describes that dry cellulose filaments (CF) made to have and having lengths of up to 300-350 µm and diameters of approximately 100-500 nm by multi-pass, high consistency refining of wood or plant fibers, can be retained when its dilute suspension is filtered through a 150- to 400-mesh screen on a Standard Sheet Machine used for making handsheets in the lab or through a moving fabric of a machine commonly used to manufacture paper, tissue or paperboard.

Also unexpectedly, it has been discovered that such cellulose filaments, when allowed to form a very thin web, sheet or film on a moving fabric of a machine commonly used to manufacture paper, tissue or paperboard, and followed by pressing and drying in the press and dryer sections of the machine respectively, are readily re-dispersible in aqueous media upon mild mechanical agitation, and this without the use of additives to prevent hornification. Furthermore, the cellulose filaments (CF) from the aqueous dispersion of the dry, water re-dispersible CF films have reinforcement power similar to the never-dried CF. In addition, new films made from the aqueous dispersion of the dry, water re-dispersible CF films have strength properties similar to films made from the never-dried CF and are free of additives. It should be noted that air drying, flash drying, spray drying, rotary air drying (i.e. conventional methods) of drying bulk material, all reduce the quality of the CF produced by high consistency refining described herein. The dry, water re-dispersible CF films can also be optionally converted to dry, water re-dispersible CF powders or flakes for shipment, storage or subsequent uses.

The term "film" as defined herein is synonymous with the words "sheet" and is understood to be a layer or membrane complex of CF having an interconnected structure or arrangement of filaments or fibrils and formed by the method of the present invention. The film defined herein, has a range of thickness from 200 to 300 µm or less, and preferably 100 to 125 µm or less, most preferably from 10 to 50 µm. The width of the film is established by the processing machine and can be up to several meters in width.

The term "free from additives" is used herein to describe CFs that have not be treated with additives to reduce hornification. The additives that are used with other cellulose fibril films include: sucrose, glycerin, ethylene glycol, dextrin or carboxymethyl cellulose. The CFs of the present invention are free of additives listed above.

The term "powders or flakes" is used herein to describe a shape that has all its three dimensions from 0.01 mm to 2.0 cm, and more preferably from 0.01 mm to 1.0 cm. The precise dimensions of the powders or flakes are established by the mechanical device(s) and the operating conditions of the device(s) used to reduce the size of the dry, water re-dispersible film of the cellulose filaments.

According to one aspect of the present invention, dry, water re-dispersible films of cellulose filaments (CF) are produced on a conventional or modified paper, tissue or paperboard machine by forming thin webs in the forming section of the machine, followed by pressing and drying in the press and dryer sections of the machine. The paper machine has a forming fabric that is a three-dimensional woven fabric with typically 100-200 microns interconnected pores. These large pores permit rapid water drainage. All previous fibrillated products would pass through the pores with minimum retention. If ever a tighter pore structure was used with these previous known products, drainage would be so low that the machine would have to run at 10-50 m/min while we can run at: 750 m/min or higher; preferably 1500 m/min and more preferably 1200 m/min. The ability of CF to be filtered on a paper machine indirectly substantiates that the filaments of the present invention are different in length from MFC and NFC formerly described. The cellulose filaments (CF) of the present invention have lengths of up to 300-350 µm and diameters of approximately 100-500 nm and are made from multi-pass, high consistency refining of wood or plant fibers. It is to be understood, however, that the optimal pore size of the forming fabric for the production of the dry, water re-dispersible films of CF, depends on the precise percentage of the filaments having lengths of up to 300-350 µm and diameters of approximately 100-500 nm in the CF which in turn is dependent upon the total energy input, the number of refining passes, the refining intensity and other refiner operating conditions used to produce the CF.

According to another aspect of the present invention, dry, water re-dispersible films of cellulose filaments (CF) of the present invention are used for the storage and/or the transportation of the CF material.

According to yet another aspect of the present invention, the dry, water re-dispersible films of cellulose filaments (CF) are converted to dry, water re-dispersible powders or flakes of cellulose filaments for the transportation, storage or subsequent use of the CF material.

According to yet another aspect of the present invention, dry, water re-dispersible films of cellulose filaments (CF) or dry, water re-dispersible powders or flakes of cellulose filaments (CF) of the present invention is used, upon re-dispersion in an aqueous medium, as an additive to reinforce cellulose fibers products such as paper, tissue and paperboard.

The dry, water re-dispersible films of cellulose filaments (CF) or the dry, water re-dispersible powders or flakes of cellulose filaments (CF) of the present invention can also be used as strong and recyclable films for the manufacturing of composites and for packaging or other applications. They can also be used, upon re-dispersion in an aqueous medium, as an additive to reinforce other consumer or industrial products.

The dryness (solid content), the basis weight, and the first pass retention of the water re-dispersible films depend on, among others, the source and total energy used to manufacture the cellulose filaments (CF), the speed of the tissue, paper or paperboard machine, and the configuration and operating parameters of the machine such as the number of vacuum box applied, the headbox consistency and flow rate, and the forming fabric pore size. The CF is manufactured to have at least 50% by weight of its fibrillated material with lengths of up to 300-350 µm and diameters of approximately 100-500 nm by multi-pass, high consistency (20-65% by weight) refining of wood or plant fibers with a total energy input of preferably 2,000-20,000 kWh/t, more preferably 5,000-20,000 kWh/t, and most preferably 5,000-12,000 kWh/t as described in the previous patent application PCT/CA2012/000060; WO 2012/097446 A1. The machine is operated in a way to allow the production of the said CF films with a solid content of preferably 70-95% and more preferably 75-95% and most preferably 80-95%; a basis weight of preferably 5-120 g/m$^2$, more preferably 10-100 g/m$^2$ and most preferably 10-80 g/m$^2$. Optionally, retention or drainage aid chemicals can be mixed with the CF in the headbox of the paper, tissue or paperboard machine to increase the first pass retention and/or the drainage rate of the said dry, water re-dispersible films of CF.

Virtually every solid material is filterable provided that pore size of the filtration medium is small enough to retain the material. However, as pore size decreases, resistance to flow increases and hence drainage decreases. The present inventors discovered that a quasi-nano material in water is filterable at high speeds, using mild pressure drop conditions (i.e. no need for high pressure or vacuum). A filtration speed of 750 m/min, 1000 m/min and more given filaments of 100-500 nm diameter on a relatively open fabric is surprising.

"Consistency" is defined herein as the weight percentage of wood or plant fibers, or cellulose filaments (CF) in a mixture of water and, wood or plant fibers, or cellulose filaments (CF).

Basis weight is defined herein, as the weight in grams (g) of the films of cellulose filaments (CF) or sheets of pulp fibers and CF per square meter (m$^2$) of the said films or sheets.

Figure 1B:
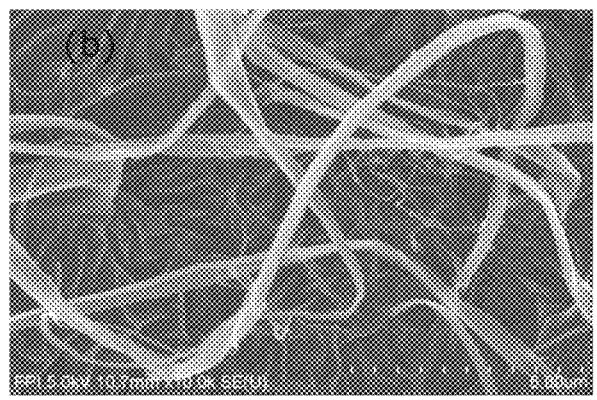
FIG. 1*b* is a scanning electron microscopy image of the representative cellulose filaments (CF) of FIG. 1*a*.

A weight that is oven-dried (od) basis in the present invention refers to the weight that excludes the weight of water. For a moist material such as CF, it is the water-free weight of the material that is calculated from its consistency Referring now to the drawings, FIG. 1 shows the scanning electron microscope images of a representative cellulose filaments (CF) with lengths of up to 300-350 µm and diameters of approximately 100-500 nm made by multi-pass, high consistency refining of a bleached softwood kraft pulp.

The final CF film product from the machine has very little to no porosity. Moreover, because the CF film of the present invention closes rapidly during formation on the machine, the drainage rapidly drops as the film consolidates and its pore system becomes sealed. Therefore, the film is best kept moving quickly on the machine and with a thin thickness. The thickness of the film is preferably 10-50 µm and not more than 300 µm.

The present invention is illustrated by, but not limited to, the following examples.

General Procedure A: Production of Dry, Water Re-Dispersible CF Films on a Pilot Paper Machine Dry, water re-dispersible CF films were produced on FPInnovations' pilot paper machine whose configuration can be adapted to produce medium to high basis weight printing and writing grades as well as tissue and towel. Detailed description of the standard configurations of the machine for paper production have been presented (Crotogino, R., et al., "Paprican's New Pilot Paper Machine," *Pulp & Paper Canada*, Vol. 101, No. 10, 2000, pp. 48-52).

In brief, the machine consists mainly of a twin-wire roll forming section the width of which is 0.46 m, a four-roll, three-nip press section and two Yankee dryers. For the production of CF films, the two configurations were found to be suitable though the tissue and towel mode was inferior in terms of economics because removal of the press section brings a much wetter film to the drying section. It was found that a single Yankee dryer was sufficient to dry the films but it should be recognized by experts in paper making that conventional dryers such as rotating steam-filled cylinders would be equally effective or superior for drying these films under controlled conditions.

Unless otherwise specified, 1000 kg oven-dried (od) basis of CF with no less than 50% by weight of its fibrillated material having lengths of up to 300-350 µm, diameters of approximately 100-500 nm and a consistency of 33-37% made from multi-pass, high consistency refining of a bleached softwood kraft pulp was dispersed with tap water in a paper machine (PM) dry end pulper/press broke pulper at 3-4% consistency and stored in a 50 m$^3$ tank. The dispersed CF was then sent to the paper machine chest where the CF was diluted to about 2.0% consistency with tap water. A fan pump loop (after PM chest) metered in additional tap water and diluted the CF slurry to 0.2-0.5% consistency. The CF stock was then screened and sent to the PM headbox. The headbox flow rate (800-5000 L/min), the machine speed (500-750 m/min), and other machine operating parameters were adjusted to allow the formation of thin films with 6-8% and 9-10.5% solid contents after the forming section without and with the use of vacuum boxes in the forming section, respectively, to reach a solid content of 30-37% for the films after the press section, and to produce the dry, water re-dispersible CF films with a solid content of 80-85% and a basis weight of 15-22 g/m$^2$ after the dryer section. The width of the dry CF films produced was 0.30-0.33 m and the first pass retention of the films was 85-90%.

General Procedure B: Laboratory Dispersion of CF or Pilot Paper Machine-Produced CF Films in an Aqueous Medium Unless otherwise specified, 24 g (od basis) of CF described in General Procedure A, or 24 g (od basis) of dry, water re-dispersible CF films produced according to General Procedure A described, was diluted to 1.2% consistency in a British Disintegrator with a known amount of deionized water (DI H$_2$O) the temperature of which had been raised to 80° C. The CF slurry was mixed at 3000 rpm for 15 minutes to give a dispersion which was then removed from the Disintegrator and cooled to room temperature (~23° C.).

General Procedure C: Dispersion of CF or Pilot Paper Machine-Produced CF Films in an Aqueous Medium in a Pilot Paper Machine Pulper Unless otherwise specified, 1000 kg (od basis) of CF described in General Procedure A, or 1000 kg (od basis) of dry, water re-dispersible CF films produced according to General Procedure A described, was diluted to 3.0-4.0% consistency in a pilot paper machine Press Broke Pulper (Beloit Vertical Tri-Dyne Pulper, Model No. 5201, Serial No. BC-1100) or a Dry-end Pulper with a known amount of tap $H_2O$ the temperature of which had been raised to ~50° C. The CF slurry was mixed at 480 rpm for 15 minutes to give a dispersion which was removed from the Pulper and stored in a 50 $m^3$ tank, then cooled to room temperature (~23° C.).

General Procedure D: Preparation of Handsheets from a Mixture of Pulp and a CF Product Unless otherwise specified, a hardwood kraft pulp (HWKP) in a dry-lap form was first combined with DI $H_2O$ and repulped/disintegrated in a helical pulper at 10% consistency, 800 rpm and 50° C. for 15 minutes. The repulped HWKP was then combined with a sample of CF dispersion prepared according to General Procedure B or C described at a weight (od basis) ratio of 96/4 (HWKP/CF) and with DI $H_2O$ to give a slurry of pulp and CF at 0.33% consistency. Handsheets (60 $g/m^2$) were prepared according to PAPTAC Test Method, Standard C.4. Tensile strengths of the sheets were determined according to PAPTAC Test Method, Standard D.34. In a separate experiment, handsheets (60 $g/m^2$) from 100% HWKP were also prepared and their tensile strengths measured.

General Procedure E: Preparation of CF Films on a Standard Sheet Machine

A circular CF film with a size of 0.02 $m^2$ was prepared using a modified PAPTAC Test Method, Standard C.5 as follows. Unless otherwise specified, 0.4, 0.8 or 1.2 g (od basis) of CF prepared according to General Procedure B or C described was diluted with DI $H_2O$ to give a CF slurry at a consistency of 0.05%. The dispersion was transferred into the Standard Sheet Machine equipped with, unless otherwise specified, a 150-mesh screen using a Teflon spoon. The dispersion inside the Standard Sheet Machine was gently stirred back and forth across the deckle using a Teflon stick and was then allowed to become still. The drain valve of the Standard Sheet Machine was then released to allow the draining of water and closed when the water had drained out from the deckle and a CF film had been formed on top of the steel mesh. Typically, over 90% of the cellulose filaments was retained in the CF film. The precise retention value depends on the total energy applied in making the CF and the screen mesh size of the Standard Sheet Machine. For CF made from multi-pass, high consistency refining of bleached softwood kraft pulp with a total specific refining energy of 5000-10,000 kWh/t, the use of 150-mesh screen allows the retention of over 90% of the filaments in the CF film. For CF made from multi-pass, high consistency refining of bleached softwood kraft pulp with a total specific refining energy of 12,000-20,000 kWh/t, the use of a 450-mesh screen allows the retention of over 90% of the filaments in the CF film.

The deckle was opened and one Whatman #1 filter paper (185 mm in diameter) was placed on top of the wet CF film. Two blotters were placed on top of the filter paper and couching was applied using a couch plate and a couch roll. 15 [for films made using 0.4 g (od basis) of CF] or 22 [for films made using 0.8 or 1.2 g (od basis) of CF] traverses backwards and forwards were applied before the couch plate and the two blotters were carefully removed. The filter paper with the CF film stuck to it was then slowly peeled off from the steel mesh.

A mirror-polished stainless steel disc was placed against the side of CF film. Pressing of the CF film was then performed according to the pressing procedure described in PAPTAC Test Method, Standard C.5 with the first and secondary pressing for 5.5 and 2.5 minutes, respectively.

After the pressing, the CF film which was sandwiched between the filter paper and the stainless steel plate was put into drying rings and dried in a constant temperature and humidity (23° C. and 50% relative humidity) room overnight. The film, with a basis weight of approximately 20, 40 or 60 $g/m^2$ from 0.4, 0.8 or 1.2 g (od basis) of CF, was then peeled off from the steel plate, and separated, by peeling off back and forth several times, from the filter paper.

EXAMPLE 1

Cellulose filaments (CF) was prepared to have no less than 50% by weight of its fibrillated material with lengths of up to 300-350 μm and diameters of approximately 100-500 nm from a bleached softwood kraft pulp by multi-pass, high consistency (33-37%) refining with a total specific refining energy of 7800-8000 kilowatts hour per ton of pulp (kWh/t) using the method previously described PCT/CA2012/000060; WO 2012/097446 A1. The CF prepared, at a consistency of 33-37%, is referred to as Never-dried CF (1).

Figure 2:
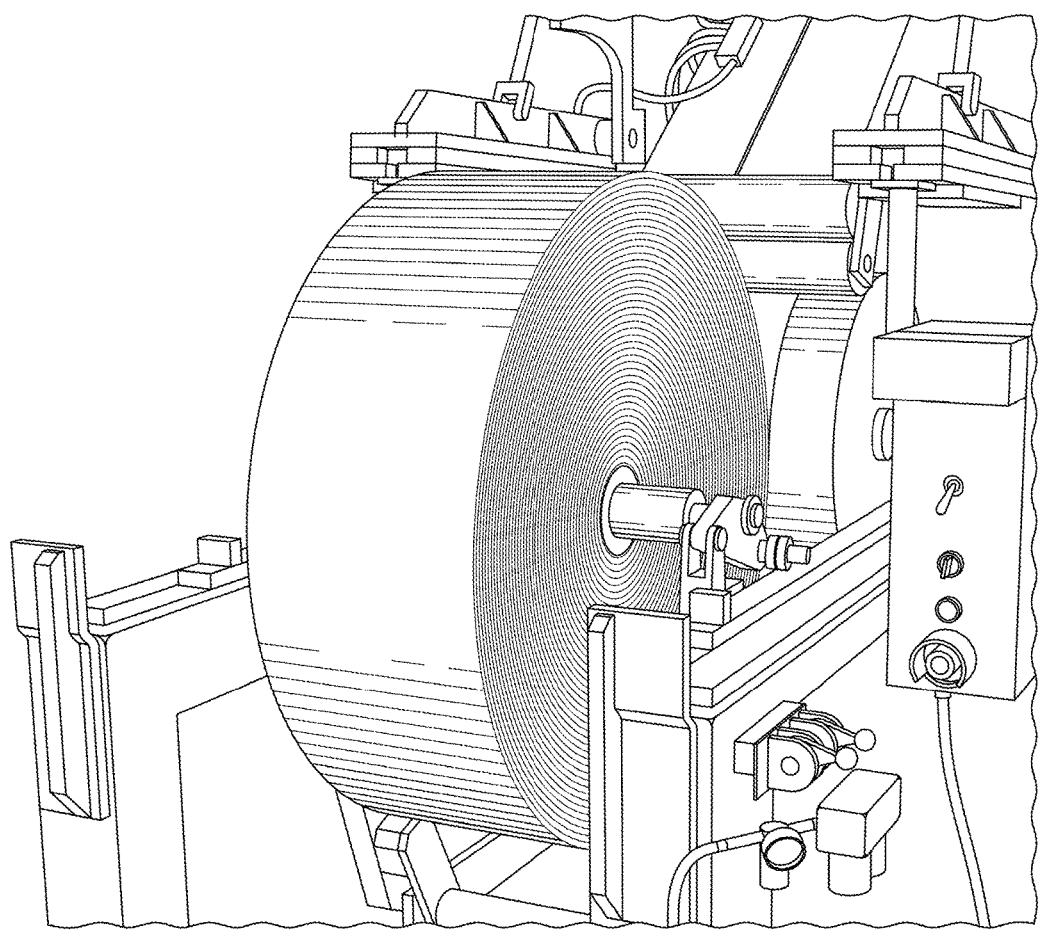
FIG. 2 is a roll of dry, water re-dispersible films of cellulose filaments (CF) produced on a pilot paper machine according to one embodiment of the present invention.

A sample (1000 kg od basis) of the Never-dried CF (1) was used to produce dry CF films on a pilot paper machine according to General Procedure A described. The basis weight of the films was in a range of 15-22 $g/m^2$, and the solid content of the films was in a range of 80-85%. FIG. 2 shows a roll of the dry, pilot paper machine-produced CF film.

A sample (24 g od basis) of the Never-dried CF (1) was dispersed in DI $H_2O$ according to General Procedure B described to give a stable dispersion referred to as Lab Dispersed, Never-dried CF (1).

A sample (24 g od basis) of the dry, pilot paper machine (PM)-produced CF film was dispersed in DI $H_2O$ according to General Procedure B described. A stable dispersion was also formed. This CF dispersion is referred to as Lab Re-dispersed, PM-dried CF (1).

A sample (1000 kg od basis) of the dry, pilot PM-produced CF film was dispersed in tap $H_2O$ in a pilot paper machine Press Broke Pulper or Dry-end Pulper according to General Procedure C described. A stable dispersion was formed. This CF dispersion is referred to as PM Pulper Re-dispersed, PM-dried CF (1).

On separate experiments, another CF was prepared to have lengths of up to 300-350 μm and diameters of 100-500 nm from the same bleached softwood kraft pulp by multi-pass, high consistency (36%) refining with a total refining energy of 8372 kWh/t using the method previously described PCT/CA2012/000060; WO 2012/097446 A1. The CF prepared, at a consistency of 36%, is referred to as Never-dried CF (2). A sample of this CF (24 g od basis) was dispersed in DI $H_2O$ according to General Procedure B described to give a stable dispersion referred to as Lab-dispersed, Never-dried CF (2).

A sample of the Never-dried CF (2) was drum dried using a domestic cloth dryer for 3 h to give a dry CF with a solid content of 85.3%. This dry CF was re-dispersed in DI $H_2O$ according to General Procedure B described to give a CF suspension referred to as Lab Re-dispersed, Drum-dried CF (2).

Handsheets (60 g/m$^2$) were prepared according to General Procedure D described from a hardwood kraft pulp (HWKP) and each of the above described CF dispersions and from the above described CF suspension. The weight (od basis) ratio of HWKP and CF was 96/4. Handsheets (60 g/m$^2$) were also prepared from 100% HWKP. Table 1 lists the tensile index values of the various handsheets determined according to General Procedure D described. The data show that the Lab Re-dispersed, PM-dried CF or the PM Pulper Re-dispersed, PM-dried CF retain over 90% of the reinforcement power of the Lab Dispersed, Never-dried CF. Thus, formation of CF films on a paper machine represents an economical mean to produce a dry CF product that can be readily dispersed in an aqueous medium and used as a superior reinforcement agent for paper production.

The data also show that Drum-dried CF is much inferior to the dry CF produced on the pilot paper machine in retaining the reinforcement power of the never-dried CF. They also support the unexpected findings and novelty of the current invention on the production of dry, water re-dispersible CF films on a paper machine.

TABLE 1

Tensile strengths of handsheets made from a hardwood kraft pulp (HWKP) without or with 4% of CF.

| CF | Tensile Index (N · m/g) | Retention of CF reinforcement power (%) |
| --- | --- | --- |
| None | 31.5 | — |
| Lab Dispersed, Never-dried CF (1) | 41.8 | — |
| Lab Re-dispersed, PM-dried CF (1) | 41.2 | 94.2 |
| PM Pulper Re-dispersed, PM-dried CF (1) | 40.8 | 90.3 |
| Lab Dispersed, Never-dried CF (2) | 39.5 | — |
| Lab Dispersed, Drum-dried CF (2) | 32.9 | 17.5 |

Retention of CF reinforcement power is defined as: [(tensile index of handsheet with Lab Re-Dispersed, Dried CF − tensile index of handsheet without CF)/(tensile index of handsheet with Lab Dispersed, Never-dried CF − tensile index of handsheet without CF] × 100%. For entry 3; it was [(41.2 − 31.5)/(41.8 − 31.5)] × 100% = 94.2%.

EXAMPLE 2

Samples of the Never-dried CF (2) described in Example 1 were air-dried at room temperature (~23° C.) for ~120 h and flash dried in a GEA Barr-Rosin pilot flash dryer at a feed rate of 100 kg/h, respectively, to give dry CF materials with solid contents of 80.9 and 87.7%. These two dry CF materials were re-dispersed, respectively, in DI H$_2$O according to General Procedure B described to give CF suspensions referred to as Lab Re-dispersed, Air-dried CF (2) and Lab Re-dispersed, Flash-dried CF (2).

Dry CF films (20 g/m$^2$) were prepared on a Standard Sheet Machine according to General Procedure E described from each of these two CF suspensions, and from each of the CF dispersions and the CF suspension described in Example 1. The tensile index values of the films were determined according to PAPTAC Test Method, Standard D.34 and listed in Table 2. The data clearly show that the CF films prepared from the re-dispersion of the dry, pilot paper machine-produced CF films have nearly the same strength as the CF films prepared from the dispersion of the Never-dried CF. Thus, dry, water re-dispersible CF films produced on a paper machine are recyclable. The data also show that Air-dried CF, Drum-dried CF or Flash-dried CF is much inferior to the dry, water re-dispersible CF produced on the pilot paper machine in making new and strong CF films. They also support the unexpected findings and novelty of the current invention on the production of dry, water re-dispersible and recyclable CF films on a paper machine.

Figure 3:
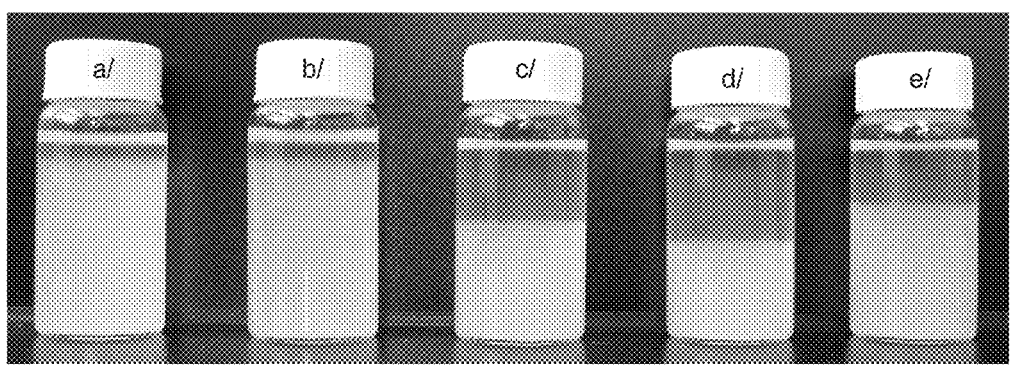
FIG. 3 illustrates five dispersion/suspensions where a/ is a comparative example of a Lab Dispersed, Never-dried CF (1); b/ is a Lab Re-dispersed, PM-dried CF (1) reflecting various embodiments of the present invention; c/ to e/ are comparative examples from conventional drying where c/ is a Lab Re-dispersed, Air-dried CF (2); d/ is a Lab Re-dispersed, Drum-dried CF (2); and e/ is a Lab Re-dispersed, Flash-dried CF (2).

On separate experiments, the various dry CF materials described above and in Example 1 were dispersed in DI H$_2$O according to General Procedure B described except that the consistency used was 0.1% instead of 1.2%. FIG. 3 shows the pictures of the dispersions or suspensions taken after 45-minute settling from a/ the Lab Dispersed, Never-dried CF (1); b/ the Lab Re-dispersed, PM-dried CF (1); c/ the Lab Re-dispersed, Air-dried CF (2); d/ the Lab Re-dispersed, Drum-dried CF (2); and e/ the Lab Re-dispersed, Flash-dried CF (2). The pictures clearly show that the dry CF films produced on a pilot paper machine have a water dispersibility identical or very similar to that of the never-dried CF, while the dry CF materials produced by air drying, drum drying or flash drying have a lower water dispersibility than the never-dried CF or the pilot paper machine-produced CF. Again, they support the unexpected findings and novelty of the current invention on the production of dry, water re-dispersible and recyclable CF films on a paper machine.

TABLE 2

Tensile index of CF films (20 g/m$^2$) made on a Standard Sheet Machine

| CF | Tensile Index (N · m/g) | Retention of CF strength property (%) |
| --- | --- | --- |
| Lab Dispersed, Never-dried CF (1) | 89.0 | — |
| PM Pulper Dispersed, Never-dried CF (1) | 84.0 | — |
| Lab Re-dispersed, PM-dried CF (1) | 86.2 | 96.8 |
| PM Pulper Re-dispersed, PM-dried CF (1) | 83.8 | 99.8 |
| Lab Dispersed, Never-dried CF (2) | 98.5 | — |
| Lab Dispersed, Air-dried CF (2) | 46.6 | 47.3 |
| Lab Dispersed, Drum-dried CF (2) | 26.0 | 26.4 |
| Lab Dispersed, Flash-dried CF (2) | 47.3 | 48.0 |

Retention of CF strength property is defined as: [tensile index of film from Re-dispersed, Dried CF/tensile index of Dispersed, Never-dried CF] × 100%.

EXAMPLE 3

A new batch of cellulose filaments (CF) was prepared to have no less than 50% by weight of its fibrillated material with lengths of up to 300-350 μm and diameters of approximately 100-500 nm from a bleached softwood kraft pulp by multi-pass, high consistency (28%) refining with a total refining energy of 8331 kWh/t using the method previously described (9). The CF prepared, at a consistency of 28%, is referred to as Never-dried CF (3). A sample of this CF (24 g od basis) was dispersed in DI H$_2$O according to General Procedure B described to give a stable dispersion referred to as Lab-dispersed, Never-dried CF (3).

Ten dry CF films (20 g/m$^2$) from the Lab-dispersed, Never-dried CF (3) were prepared on a Standard Sheet Machine (SSM) according to General Procedure E described. The tensile index values of the films were determined according to PAPTAC Test Method, Standard D.34. Additional dry CF films (110 in total) with basis weights of 20, 40 and 60 g/m$^2$, respectively, were also prepared on a SSM according to General Procedure E described. These additional dry CF films were re-dispersed separately for each basis weight [20, 40 and 60 g/m$^2$ (gsm)] in DI H$_2$O according to General Procedure B described to give three stable dispersions, referred to as Lab Re-dispersed, 20 gsm-SSM-dried CF (3), Lab Re-dispersed, 40 gsm-SSMdried CF (3), and Lab Re-dispersed, 60 gsm-SSM-dried CF (3), respectively. Ten dry CF films (20 g/m²) from each of these dispersions were prepared on a SSM according to General Procedure E described. The tensile index values of the films were determined according to PAPTAC Test Method, Standard D.34. The average value and the standard deviation of each set of the ten dry films are listed in Table 3. The data show that dry, Standard Sheet Machine-produced CF films with a basis weight from 20 to 60 g/m² can be readily re-dispersed and used to produce new films with practically the same strength as the films prepared from the never-dried CF.

TABLE 3

Tensile index of CF films (20 g/m²) made from never-dried CF and dry Standard Sheet Machine (SSM)-produced CF films with different basis weights [g/m² (gsm)]

| CF | Tensile Index (N · m/g) |
|---|---|
| Lab Dispersed, Never-dried CF (3) | 111 ± 3 |
| Lab Re-dispersed, 20 gsm-SSM-dried CF (3) | 110 ± 3 |
| Lab Re-dispersed, 40 gsm-SSM-dried CF (3) | 108 ± 5 |
| Lab Re-dispersed, 60 gsm-SSM-dried CF (3) | 113 ± 1 |

EXAMPLE 4

Ten dry CF films (20 g/m²) from the Lab-dispersed, Never-dried CF (3) and ten dry CF films (20 g/m²) from the Lab Re-dispersed, 20 gsm-SSM-dried CF (3) described in Example 3 were prepared on a Standard Sheet Machine according to General Procedure E described except that the drying of the films was performed on a speed dryer at 150° C. for 30 seconds. The tensile index values of the films were determined according to PAPTAC Test Method, Standard D.34. The average value and the standard deviation of each of the ten films, along with those of the films dried in a constant temperature and humidity (CTH) (23° C. and 50% relative humidity) room overnight according to General Procedure E described, are listed in Table 4. The data show that the drying speed (temperature and time) has very little effect on the strength properties of the CF films made from the never-dried or the re-dispersed, Standard Sheet Machine-dried CF. The high temperature/high speed dried, Standard Sheet Machine-produced CF films can be readily re-dispersed and used to produce new films with practically the same strength as the films prepared from the never-dried CF at different drying temperatures/speeds.

TABLE 4

Tensile index of CF films (20 g/m²) made from Never-dried CF and from dry Standard Sheet Machine (SSM)-produced CF films on a Standard Sheet Machine and dried in a CTH room or on a speed dryer

| CF | Drying Method | Tensile Index (N · m/g) |
|---|---|---|
| Lab Dispersed, Never-dried CF (3) | CTH room | 111 ± 3 |
| Lab Dispersed, Never-dried CF (3) | Speed dryer | 109 ± 3 |
| Lab Re-dispersed, 20 gsm-SSM-dried CF (3) | CTH room | 110 ± 3 |
| Lab Re-dispersed, 20 gsm-SSM-dried CF (3) | Speed dryer | 106 ± 3 |

EXAMPLE 5

Samples (1.0 kg od basis) of the dry, water re-dispersible CF film with a width of ~30 cm produced on a pilot paper machine according to General Procedure A described and referred to as PM-prouduced CF web were shredded into smaller films (approximately 2 cm×2 cm) using a pilot plant shredder (Destroyit 4005 CC, IDEAL Krug & Priester GmbH & Co. KG, Simon-Schweitzer-StraRe 34, 72336 Balingen, Germany). The shredded film (1.0 kg) was grinded into dry, water re-dispersible CF powders with different sizes on a pilot plant grinder (Willy Mill No. 1, Arthur H. Thomas Co, Vine St. Phildelphia, Pa. 19102, USA) equipped with 3.2-mm, 2.0-mm, and 1.0-mm hole diameter screens, respectively. Samples (20 g od basis per sample) of the PM-produced CF film and of the dry, water re-dispersible CF powders (referred to as dry CF powders) obtained from the PM-produced CF film using the three different screens were dispersed, respectively, according to General Procedure B. Ten dry CF films (20 g/m²) from each of the dispersed, PM-produced CF film and the three dispersed, dry CF powders were prepared on a Standard Sheet Machine according to General Procedure E described. The tensile index values of the films were determined according to PAPTAC Test Method, Standard D.34. The average value and the standard deviation of each of the ten films are listed in Table 5. The data show that the bigger the screen hole diameter of the grinder, the higher the tensile index. Even without further optimization of the grinding conditions such as the screen hole diameter of the grinder, the sharpness of the knife blade and the residence time in the grinder, the dry CF powder obtained using the grinder equipped with a 3.2-mm hole diameter screen retained 78% of the tensile index of the PM-produced CF film.

TABLE 5

Tensile index of CF films (20 g/m²) made on a Standard Handsheet Machine from samples of the PM-produced CF film and of the dry CF powders obtained from the shredding and grinding of the PM-produced CF film using a grinder equipped with 1.0, 2.0 and 3.2-mm diameter screens, respectively; prior to making the dry CF films on the Standard Handsheet Machine the PM-produced CF film or the dry CF powders were dispersed according to General Procedure B.

| CF | Tensile Index (N · m/g) |
|---|---|
| PM-produced CF film | 87 ± 3 |
| Dry CF powders from PM-produced CF film using grinder with a 3.2-mm diameter hole screen | 68 ± 1 |
| Dry CF powders from PM-produced CF film using grinder with a 2.0-mm diameter hole screen | 52 ± 3 |
| Dry CF powders from PM-produced CF film using grinder with a 1.0-mm diameter hole screen | 46 ± 3 |

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:
1. A film of dry cellulose filaments, the film comprising a basis weight of 5 to 120 g cellulose filaments/m² of film, at least 50% by weight of the filaments having:
   a filament length up to 350 μm and a diameter of between 100 and 500 nm,
   wherein the filaments are fibrillated and free of additives and derivatization, wherein the film comprising a solids content of 75% to 95% by weight solids, and wherein the film is produced from a liquid suspension on a paper making machine and is re-dispersible in water.

2. The film according to claim 1, wherein the film has a range of thickness from 10 to 300 μm.

3. The film according to claim 1, wherein the filaments lengths are between 300 and 350 μm.

4. The film according to claim 1, wherein the basis weight is 10 to 100 g of cellulose filaments/m² of film.

5. The film according to claim 1, wherein the basis weight is 10 to 80 g of cellulose filaments/m² of film.

6. The film according to claim 1, wherein the solids content is 80% to 95% by weight solids.

7. A method of making a dry film of fibrillated cellulose filaments comprising:

providing a liquid suspension of the cellulose filaments wherein at least 50% by weight of the filaments comprise a filament length up to 350 μm; and a filament diameter between 100 and 500 nm, wherein the filaments are fibrillated and free of additives and derivatization, and retaining over 90% of the filaments on a forming section of a paper making machine, wherein the film produced is re-dispersible in water, and the film comprising a basis weight of 5 to 120 g cellulose filaments/m² of film, a solids content of 75% to 95% by weight solids.

8. The method according to claims 7, wherein the paper making machine is a Sheet Machine with a 150- to 400-mesh screen.

9. The method according to claim 7, further comprising pressing the film in a press section of the machine to produce a pressed film.

10. The method according to claim 9, further comprising drying the pressed film in at least one dryer section of the machine to produce the dry film.

11. The method according to claim 7, wherein the film produced has a range of thickness from 200-300 μm or less.

12. The method according to claim 7, wherein the filaments lengths are between 300 and 350 μm.

13. The method according to claim 7, wherein the paper making machine operates at a speed of 500-1500 m/min.

14. The method according to claim 7, wherein the basis weight is 10 to 100 g of cellulose filaments/m² of film.

15. The method according to claim 7, wherein the basis weight is 10 to 80 g of cellulose filaments/m² of film.

16. The method according to claim 7, wherein the solids content is 80% to 95% by weight solids.

* * * * *